United States Patent Office 3,849,391
Patented Nov. 19, 1974

3,849,391
RECOVERY OF PROTEIN
Carl T. Egger and Robert E. Olson, Muscatine, Iowa, assignors to Grain Processing Corporation, Muscatine, Iowa
No Drawing. Continuation of abandoned application Ser. No. 799,960, Feb. 17, 1969. This application Mar. 12, 1973, Ser. No. 340,181
Int. Cl. A23j 1/14, 1/18
U.S. Cl. 260—123.5                               7 Claims

ABSTRACT OF THE DISCLOSURE

Protein is separated from protein-containing source materials by rapidly heating a slurry of the source material under pressure and then flash cooling the heated slurry under reduced pressure.

---

This is a continuation of application Ser. No. 799,960, filed Feb. 17, 1969, and now abandoned.

This invention relates to separation of protein from protein-containing source material.

At the present time the efficient separation of protein from various vegetable and microbial sources is of great importance to the art.

The common practice for separating protein from a protein source material such as soybeans has been to soak the source material in from about 8 to 10 volumes of water for periods from 30 to 120 minutes; the pH of the aqueous system being maintained between about 9 and 11 by the addition of alkalis such as sodium hydroxide or potassium hydroxide. At the end of the soaking period insoluble materials are separated by screening, filtration or centrifugation and again subjected to soaking and separation. This procedure, carried out as a batch operation, is generally repeated several times. The aqueous extracts containing soluble materials are usually stored until all of the extractions are completed. This procedure is not only time consuming but also creates conditions which allow growth and development of indigenous microorganisms. Accordingly, with such processes it is generally necessary to subject the aqueous extracts or recovered products to a heat treatment at temperatures above 100° C. for a period of several hours or more in order to kill the microorganisms and in the case of soybeans to destroy or inactivate trypsin inhibitors. Following the heat treatment the aqueous extracts can then be processed by various procedures to produce milk type products, protein flours, concentrates or precipitates. This known multiple extraction procedure generally provides less than optimum recovery of protein from the source material. For example, in the case of soybeans, the recovery of protein is generally in the range of only about 55 to 66% with the additional protein remaining in the wastes. Moreover, the multiple extraction process involves handling of large volumes of liquid and thus is time consuming and costly. Also, the required heat treatment for relatively long periods is detrimental in that the recovered protein tends to be denatured and exhibits a low degree of water solubility. A protein recovery process which avoids the various disadvantages of multiple extraction procedures is thus highly desirable and it is a principal object of this invention to provide such an improved process.

A further object of this invention is to provide an improved process for recovering protein from vegetable or microbial sources, which process can be conducted in substantially continuous manner with a high recovery of protein.

A specific object of this invention is to provide an efficient process for separating protein from soybeans.

The process of this invention involves the following steps:

(1) an aqueous slurry of a selected protein source material is prepared,
(2) the aqueous slurry is subjected under pressure to high temperatures,
(3) the heated slurry is then cooled under reduced pressure, and
(4) the cooled slurry can then be processed by conventional procedures to obtain a desired protein product.

In Step (1), an aqueous slurry is formed by mixing a selected protein source material with water to obtain a good dispersion. The protein source material can be of vegetable origin such as, for example, soybeans or other oilseeds, alfalfa, grasses, corn and the like or it can be of microbial origin such as yeasts, bacteria and fungi. Generally, mixing with vigorous agitation for periods of about 10 minutes or less is sufficient. The slurry can be formed continuously by introducing water and the protein source material into a mixing tank and concurrently withdrawing the slurry therefrom. The maximum solids content of the slurry is governed by material handling considerations; i.e. the capability of the equipment employed to transfer the slurry to the pressure cooker. It is also preferable, particularly with vegetable protein sources such as soybeans, that the protein source material be employed in particulate form so as to increase exposure of the protein to the solvent. Thus, if necessary the protein source material, such as soybeans, can be ground, flaked or shredded to a particulate form.

The pH of the aqueous slurry is not critical and can range from about 1.5 to 11, excluding the isoelectric point for the particular protein being separated. However, there is generally an optimum pH for maximum recovery of protein from a particular source material. Thus, the optimum and preferred pH for treating soybeans is about 6.8 to 7.2; for corn 6.8 to 9.0; for alfalfa and bluegrass 7.0 to 11.0; for microbial material 6.0 to 9.0. Adjustment of the pH to the optimum can be accomplished by adding to the aqueous slurry various cations such as $NH_4^+$, $K^+$, $Na^+$, $Ca^{++}$ and so forth.

In Step (2), the slurry from the mixing tank is rapidly heated to a temperature within the range from about 250° F. to 350° F. The heating is carried out under pressures ranging from about 15 p.s.i.g. to 250 p.s.i.g. Any suitable heating equipment can be employed. The slurry is maintained at a temperature from 250 to 350° F. under pressure for relatively short periods, generally for periods of not more than about 4 to 6 minutes. This relatively short heating period at high temperatures under pressure is an important feature of the present process for achieving maximum extraction of the protein. The high temperature pressure treatment for a short period effectively destroys microbial species that may be present and, in addition, in the case of soybeans inactivates the trypsin inhibitors.

In Step (3), the heated slurry is flash cooled by rapidly transferring the hot slurry into a flash chamber under a pressure less than that employed in the heating step or to a vacuum chamber to accomplish vapor release. In this step it is desired to achieve maximum vaporization and pressures or negative pressures (vacuum) can be selected to accomplish this desideratum. This flash cooling step further increases protein recovery due to particle rupture caused by sudden depressurization. The solids level of the slurry is increased due to the release of steam and very importantly deodorization is simultaneously accomplished. Recovery of vapor constituents can be accomplished conventionally, if desired.

In Step (4), the cooled slurry is removed from the flash chamber and is then suitable for further processing to produce desired protein products such as milk type products, protein flours, concentrates or precipitates. The slurry removed from the flash chamber can be subjected to drying to produce a protein flour. Similarly, it can be subjected to a separation to remove the insoluble portion leaving the soluble liquid portion which can be utilized as a base for producing, for example, soy milk. The soluble portion can be dried under suitable conditions to produce a protein concentrate of high water solubility. Further refining of this soluble portion into an isolate can be achieved by subjecting it to an isoelectric precipitation or alcohol precipitation to produce a high quality protein isolate or precipitate. The slurry removed from the flash chamber contains a high amount of the recoverable protein in the protein source material. For example, in the case of soybeans the slurry generally contains in excess of 80% of the available protein which is an improvement over prior art recovery processes.

The following examples further illustrate the invention and the advantages thereof. In these examples the protein source material in slurry form was heat treated utilizing equipment as described below although various types of other suitable apparatus can be similarly employed:

The slurry to be heated was placed in a stainless steel kettle equipped with an agitator. The kettle discharge is connected to a suitable pump by means of a high pressure hose. The pump discharge is connected by a high pressure hose to a steel suction T. A steam source is connected to the suction T with a valve located in the steam line just prior to the suction T.

The suction T discharge is connected to a stainless steel pipe having a diameter of 0.75 inch and a length of approximately 48 feet. This pipe constitutes a pressure cooker. A thermometer is placed in the pipe at the 12 foot length and at the discharge end of the system there is a pressure gauge and a throttling needle valve.

The pipe discharges into a vented flash chamber. An outlet in the bottom of the flash chamber discharges into a suitable receiver.

EXAMPLE I

Flash desolventized white soybean flakes with a P.D.I. analysis (Protein Dispersion Index) in excess of 80 percent were ground using a burr mill to a fineness that would allow all of the material to pass a 10 mesh and none would pass a 100 mesh standard screen. 7.5 pounds of the ground meal was added to 12 gallons of water in the cooker feed kettle and thoroughly mixed to form a uniform dispersion. The pH of this dispersion was 6.7. The soybean meal-water dispersion was fed through the pressure cooker at a rate of 20 gallons per hour. The temperature of the system at the 12 foot point was maintained at 300° F. by partially throttling the valve just prior to the vented flash chamber inlet. Cooking was carried out at a pressure of at least 40 p.s.i.g. for a period less than 4 minutes. The contents of the pipe after the suction T discharge was a mixture of steam and 300° F. slurry. The hot discharged slurry, flash cooled in the flash chamber vented to the atmosphere, contained 3.11 percent total solids, being somewhat diluted due to the condensed steam incorporated in the slurry during the heating cycle.

An aliquot of 693 grams of the hot slurry was centrifuged. After centrifugation the liquor was separated from the solid residue by decanting into a beaker. A total of 630 grams of decanted liquor was obtained containing 2.58 percent total solids. The sludge remaining in the centrifuge bottles was removed and dried in an oven at 100° C. The dried sludge contained 9.3 percent of the input protein, 21.0 percent of the input solids and had an as is assay of 21.6 percent protein.

The pH of the 630 grams of recovered decanted liquor was adjusted to the isoelectric point for soybean protein using dilute hydrochloric acid. After standing, the precipitate was separated from the solution by centrifugation. 562.2 grams of decanted liquor containing 1.01 percent total solids was recovered from the pH adjusted material. The protein precipitate remaining in the centrifuge bottles was removed and dried in a laboratory oven at 100° C. The dried precipitate weighed 12.0 grams, contained 81.0 percent of the input protein, 50.7 percent of the input solids and had a protein content of 86.2 percent.

EXAMPLE II

Flash desolventized white soybean flakes with a P.D.I. (Protein Dispersion Index) analysis in excess of 80 percent were washed by adding 8 pounds of flakes to 100 pounds of water at a pH of 4.5. The flakes were mixed for 30 minutes and then the insoluble residue was recovered by centrifugation. The recovered solids residue (soybean meal) was added to water and thoroughly mixed to form a uniform dispersion. The pH of this dispersion was approximately 6.7. The soybean meal-water dispersion was fed through the pressure cooker as described above at a rate of 20 gallons per hour. The temperature of the system at the 12 foot point was maintained at 300° F. by partially throttling the valve just prior to the flash chamber inlet. Cooking was conducted at a pressure of at least 40 p.s.i.g. for less than 4 minutes. The slurry was flash cooled by passing it to the flash chamber vented to the atmosphere.

An aliquot of the above slurry was centrifuged. After centrifugation the liquor obtained was adjusted to the isoelectric point for soybean protein using hydrochloric acid. After standing, the precipitate was separated by centrifugation. The precipitate was diluted with water to a pumpable consistency (15–20% solids) and the pH adjusted to 7.0 using sodium hydroxide and spray dried. The spray dried precipitate contained 92.8 percent protein, tested negative for trypsin inhibitors and passed the bacterial specifications for U.S. Extra grade of edible casein as set forth in The Federal Register, vol. 33, No. 141, p. 10385.

EXAMPLE III

A soybean concentrate is prepared by heat treating soybean flakes as in Example I or II and centrifuging the resulting slurry. The centrifuge liquor is adjusted to a pH of 7.0 using sodium hydroxide and then spray dried. The resulting dried product is characterized as containing a high percentage (>90%) of the input undenatured protein, is substantially free of trypsin inhibitors, is deodorized and has solubility characteristics in water which are visibly enhanced when compared with conventional concentrates.

EXAMPLE IV

Compressed distillers yeast containing 57 percent protein on a dry basis was slurried in tap water at a temperature of 85–90° F. to form a slurry containing 3.9 percent total solids. The pH of the slurry was adjusted to 7.0 using alkali. The slurry was pressure cooked using the equipment described previously at a temperature of 300° F. and a pressure of at least 65 p.s.i.g., and a contact time of 4 minutes.

The slurry recovered from the pressure cooker discharge, flash cooled in the vented flash chamber, contained 2.75 percent solids, being somewhat diluted due to the condensed steam incorporated in the slurry during the heating cycle.

An aliquot of 503.2 grams of the slurry was centrifuged to separate the solubles from the insolubles. After centrifugation the insoluble phase was dried. The dried product had a protein content of 64.3 percent and contained 83.1 percent of the input protein.

A second aliquot of the pressure cooked slurry was obtained and the two phases separated while the solution was hot. The pH of the effluent obtained was lowered to 2.5 using acid to form a precipitate.

The precipitate was recovered by centrifugation and dried. The dried precipitate contained 89.1 percent protein.

A third aliquot of the pressure cooked slurry was obtained and to this slurry was added dioctyl sodium sulfosuccinate at a level equal to ½ percent of the total solids present. The slurry was kept hot and thoroughly mixed before separating the soluble from the insolubles. The pH of the soluble fraction was lowered to pH 2.5, using acid, to form a precipitate. The precipitate was recovered, dried and the dried product contained 90.9 percent protein.

The above examples illustrate the high recovery of protein from protein source materials which can be achieved by means of the present process. It will be appreciated that the process of the invention can be conducted utilizing any suitable equipment which provides for heating of the protein source material under pressure, the heating being accomplished directly, such as steam injection, or indirectly, such as in a heat exchanger. Also, any suitable equipment can be employed to accomplish flash cooling of the heat treated material. Likewise, drying of the extracted protein can be accomplished by a variety of means such as by spray drying, freeze drying or chemical drying, i.e. by use of chemicals which remove water such as methanol or acetone.

The process of the invention affords numerous advantages as is apparent from the foregoing description of the invention. Among the advantages of the invention which may be mentioned are: (a) the disclosed process can be carried out in a continuous manner; (b) high recovery of available protein from various source materials is readily accomplished; (c) the extracted protein is not appreciably denatured; (d) the recovered protein is of high purity; (e) trypsin inhibitors normally present in certain protein source materials such as soybeans are substantially inactivated; (f) the process is susceptible to various modifications to increase its economic attractiveness; (g) the solid materials produced as by-products in the process (e.g. insoluble materials resulting from the heat treating step) can be advantageously employed in animal feeds.

Those modifications and equivalents which fall within the spirit of the invention are to be considered a part thereof.

We claim:

1. A process for recovering protein from a protein-containing source material of vegetable or microbial origin which comprises forming at a pH other than the isoelectric pH of the protein an aqueous slurry of said protein source material, rapidly heating said slurry under pressure to and holding at a temperature in the range from about 250 to 350° F. for a period of not more than six minutes, flash cooling the heated slurry under reduced pressure to accomplish separation of vapor therefrom, and recovering the cooled homogeneous slurry containing protein in solution.

2. A process in accordance with claim 1 wherein the protein source material is a vegetable protein source material containing protein and water-insoluble substances naturally present in said material or a microbial protein source material containing protein and water-insoluble substances naturally present in said material.

3. A process in accordance with claim 1 wherein the protein source material is selected from the group consisting of defatted soybeans in comminuted form, partially defatted soybeans in comminuted form and full fat soybeans in comminuted form.

4. A process for recovering protein from a protein-containing source material of vegetable or microbial origin which contains protein and water-insoluble substances naturally present in said material which comprises forming at a pH other than the isoelectric pH of the protein an aqueous slurry of said protein source material, rapidly heating said slurry under pressure to and holding at a temperature in the range from about 250 to 350° F. for a period of not more than six minutes, flash cooling the heated slurry under reduced pressure to accomplish separation of vapor therefrom, recovering the cooled homogeneous slurry containing protein in solution, and drying said slurry to produce a protein flour.

5. A process for recovering protein from a protein-containing source material of vegetable or microbial origin which contains protein and water-insoluble substances naturally present in said material which comprises forming at a pH other than the isoelectric pH of the protein an aqueous slurry of said protein source mateiral, rapidly heating said slurry under pressure to and holding at a temperature in the range from about 250 to 350° F. for a period of not more than six minutes, flash cooling the heated slurry under reduced pressure to accomplish separation of vapor therefrom, recovering the cooled homogeneous slurry containing protein in solution, separating solids from liquid in said slurry, then precipitating protein from the separated liquid and finally recovering the precipitated protein.

6. A process for recovering protein from a protein-containing source material of vegetable or microbial origin which contains protein and water-insoluble substances naturally present in said material which comprises forming at a pH other than the isoelectric pH of the protein an aqueous slurry of said protein source material, rapidly heating said slurry under pressure to and holding at a temperature in the range from about 250 to 350° F. for a period of not more than six minutes, flash cooling the heated slurry under reduced pressure to accomplish separation of vapor therefrom, recovering the cooled homogeneous slurry containing protein in solution, precipitating the protein, separating solids from liquid in said slurry, and drying the so-obtained solids to produce a protein concentrate.

7. A process for recovering protein from a protein-containing source material of vegetable or microbial origin which contains protein and water-insoluble substances naturally present in said material which comprises forming at a pH other than the isoelectric pH of the protein an aqueous slurry of said protein source material, rapidly heating said slurry under pressure to and holding at a temperature in the range from about 250 to 350° F. for a period of not more than six minutes, flash cooling the heated slurry under reduced pressure to accomplish separation of vapor therefrom, recovering the cooled homogeneous slurry containing protein in solution, separating solids from liquid in said slurry and recovering the protein-containing liquid from said separation.

References Cited

UNITED STATES PATENTS

| | | | |
|---|---|---|---|
| 2,631,111 | 3/1953 | Meyer | 127—69 |
| 3,047,395 | 8/1962 | Rusoff et al. | 99—14 |
| 3,303,182 | 2/1967 | Sakai et al. | 99—98 X |
| 3,642,490 | 2/1972 | Hawley et al. | 99—17 |

JAMES R. HOFFMAN, Primary Examiner

U.S. Cl. X.R.

260—112 R

UNITED STATES PATENT OFFICE
CERTIFICATE OF CORRECTION

PATENT NO. : 3,849,391
DATED : November 19, 1974
INVENTOR(S) : CARL THOMAS EGGER and ROBERT ERICK OLSON It is certified that error appears in the above-identified patent and that said Letters Patent are hereby corrected as shown below:

Column 5, line 5, "soluble" should be -- solubles --

Column 6, line 22, after "separating" insert -- insoluble -- line 38, after "separating" insert -- insoluble -- line 53, after "separating" insert -- insoluble --

Signed and Sealed this ninth Day of December 1975

[SEAL]

Attest:

RUTH C. MASON
*Attesting Officer*

C. MARSHALL DANN
*Commissioner of Patents and Trademarks*